Nov. 23, 1943.                    J. MORKOSKI                    2,334,947
                                POWER LIFT DEVICE
                              Filed June 10, 1942                 2 Sheets-Sheet 1
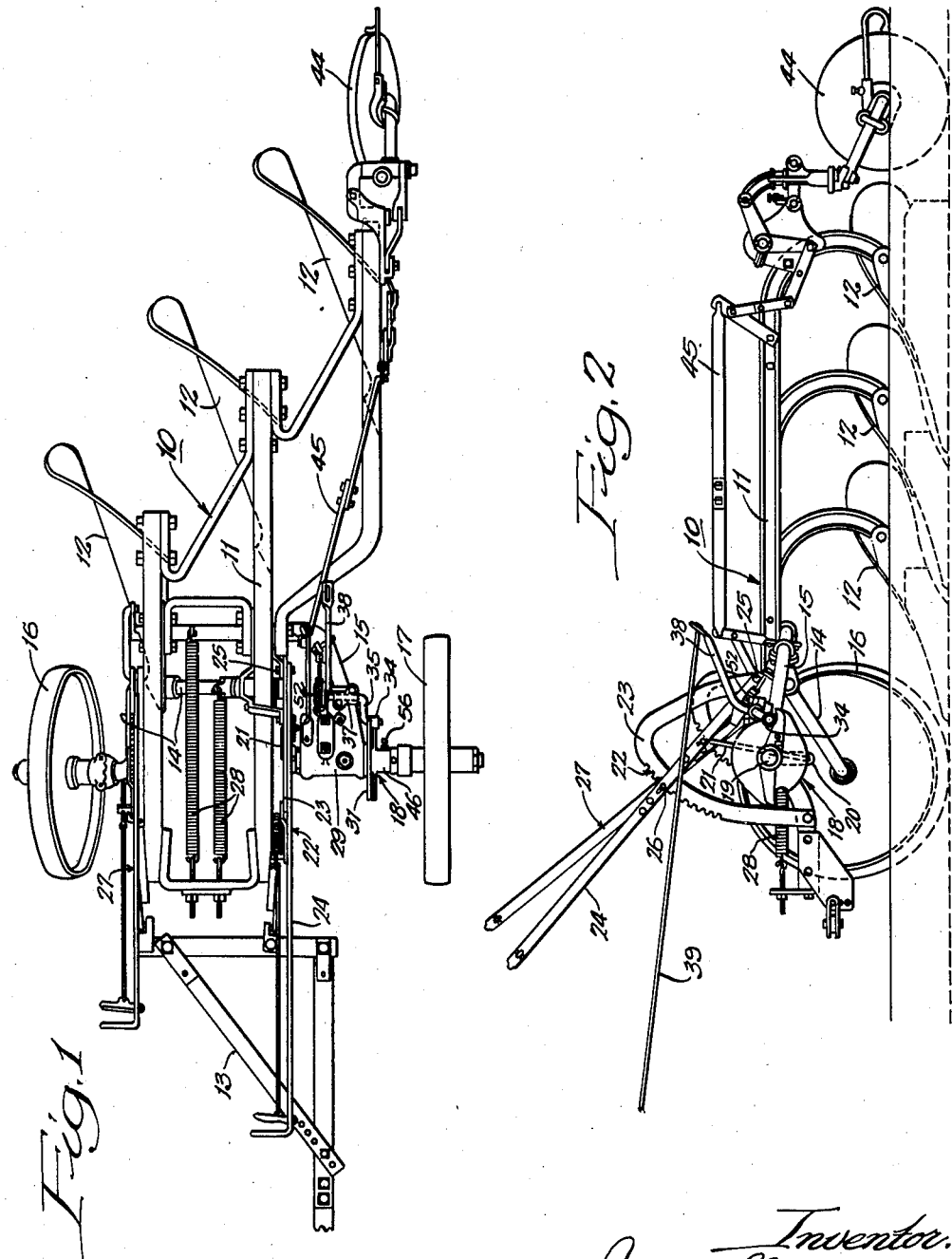
Inventor:
James Morkoski,
By Paul C. Pippel
    Attorney.

Nov. 23, 1943. J. MORKOSKI 2,334,947
POWER LIFT DEVICE
Filed June 10, 1942 2 Sheets-Sheet 2
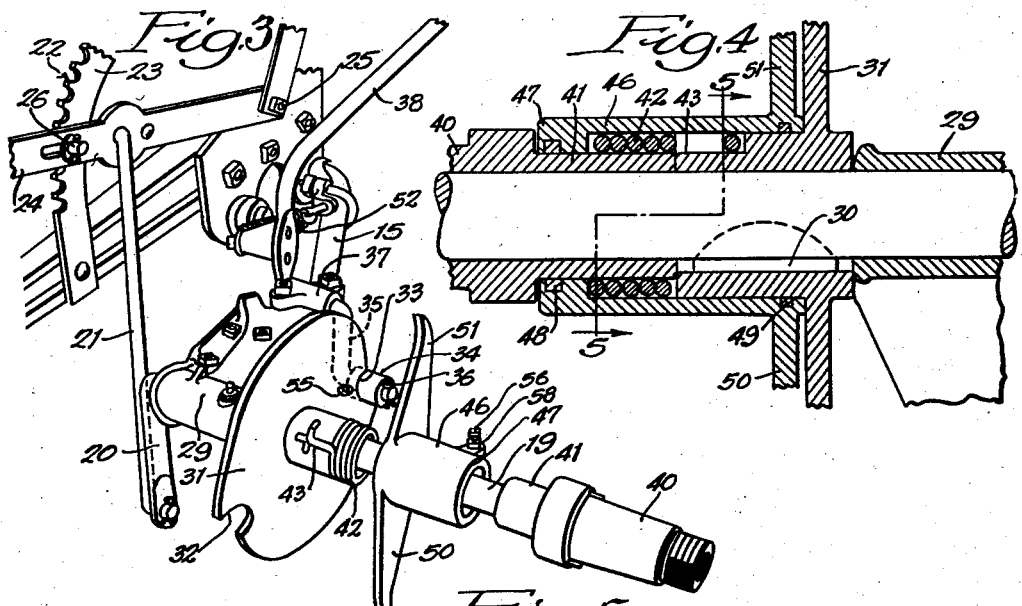
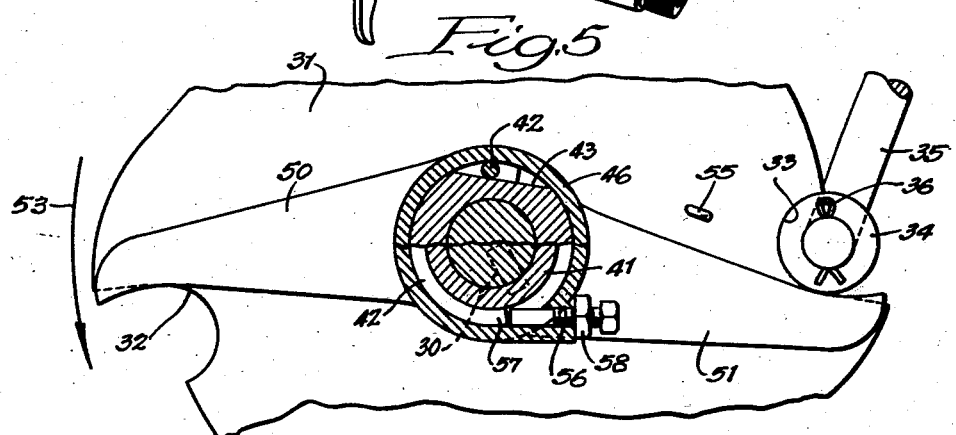
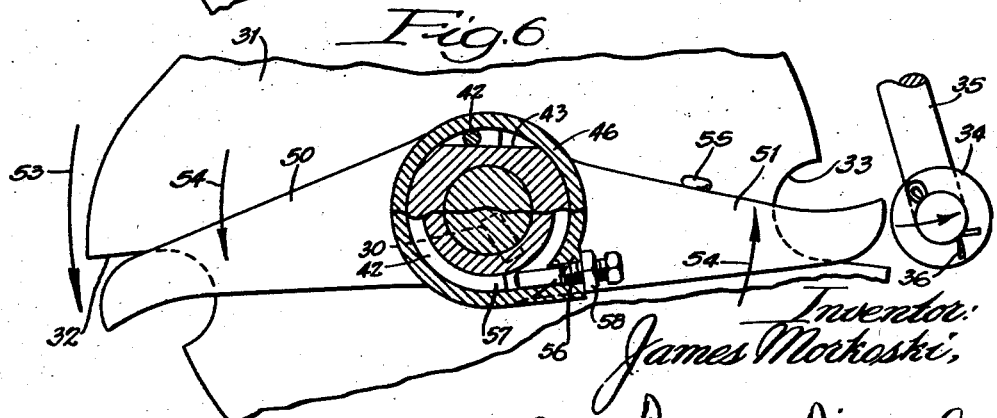
Inventor:
James Morkoski
By Paul O. Pippel
Attorney.

Patented Nov. 23, 1943

2,334,947

UNITED STATES PATENT OFFICE 2,334,947

POWER LIFT DEVICE

James Morkoski, Canton, Ill., assignor to International Harvester Company, a corporation of New Jersey Application June 10, 1942, Serial No. 446,441

8 Claims. (Cl. 97—73)

This invention relates to power lift devices and more particularly to such devices which are used with agricultural implements and the like.

It is an object of the present invention to provide a power lift device for agricultural implements which is simple in construction, cheap to manufacture, and one which is so constructed that it is practically dirt proof, wherein the general wear of these devices will be greatly increased.

It is still another object of the invention to provide in a power-lift clutch device for agricultural implements of a type utilizing a coil spring adapted for frictional engagement with a ground driven part, means whereby adjustment may be made to take care of manufacturing irregularities and of wear of the frictional engaging parts.

According to the present invention, there has been provided a power lift device of a type utilizing the principles of an over-running clutch with an external means with which to release its coil spring to permit frictional engagement of the spring with the running part in order that lifting force may result. On the crank axle means of a plow frame there is provided a crankshaft on which is journaled a ground drive wheel having a cylindrical face portion thereon. About this cylindrical face portion is wrapped a coil spring in such a manner that it will grip the face portion when released by a control means associated with the device. One end of the coil spring is anchored to the crank-shaft and when the spring is released so that the coil spring frictionally engages the face portion, the crank-shaft will be rotated by the spring and lifting force will be imparted by its crank to the plow frame forming a part of the agricultural implement to thereby cause lifting movement of the frame about its crank axle. The control means includes means accessible to the operator of the agricultural implement and means for automatically unwrapping the spring about a face portion at the end of a half revolution of the crankshaft. Associated also with the control means is an adjustable stop means adapted to contact the other end of the coil spring to retain the same in its proper unwrapped condition.

For other objects and for a better understanding of the invention reference may be had to the following detailed description taken in connection with the accompanying drawings, in which:

Figure 1 is a plan view of an agricultural implement incorporating the power-lift clutch device of the present invention;

Figure 2 is a view in elevation of the agricultural implement shown in Figure 1 and of the power-lift device;

Figure 3 is an enlarged perspective view of the power-lift device with some of the parts thereof arranged in exploded relationship;

Figure 4 is a view in cross-section taken through a portion of the power lift device;

Figure 5 is an end elevational view, partly in section, of the power lift device and taken along the line 5—5 of Figure 4 and illustrating the position of the control element and of the controlling parts when the coil spring is released from the cylindrical face portion of the ground wheel means; and Figure 6 is a similar elevational view taken along the line 5—5 of Figure 4 and illustrating the position of the controlling parts when they have been released to permit frictional engagement of the coil spring with the cylindrical face portion of the ground wheel means.

Referring now particularly to Figures 1 and 2, there is shown a multiple furrow plow 10 including a plow frame 11 with plow bottoms 12 thereon. This plow frame has pivotally connected to its forward end, a hitch frame 13 serving to connect the implement to the tractor. The plow frame is supported on interconnected crank axles 14 and 15. The crank axle 14 has a supporting forward furrow wheel 16 while the crank axle 15 has a land wheel 17 serving to operate a power lift device 18 of the present invention.

The power lift device 18 includes a crank-shaft 19 having on its inner end a crank arm 20 which is in turn connected through a lifting link 21 with a depth adjusting mechanism 22 carried on the plow frame 11. This adjusting mechanism 22 includes a quadrant 23 rigidly mounted on the plow frame and an adjusting lever 24 adapted for adjustment over the quadrant 23 and pivoted to it at its lower end as indicated at 25. The adjusting lever 24 has usual detent mechanism 26 for securing the lever in a fixed position on the quadrant 23. As the adjusting lever 24 is operated, the plowing depth of the plow bottoms 12 can be adjusted. At the opposite side of the plow frame 11 is a manually adjustable mechanism 27 located in the connections between the two crank axles 14 and 15 to thereby effect a leveling adjustment of the plow frame or an adjusting of one of the plow wheels with respect to the other plow wheel. Spring devices 28 are used to assist in adjusting by the manually adjustable mechanisms. These spring devices are respectively connected between the plow frame and the respective crank axles 14 and 15.

Referring now particularly to Figure 3, there is shown an enlarged exploded view of the power lift device and of a portion of the manually adjustable mechanism 22 through which connection is made of the power lift device with the plow frame 11 of the implement. The connection of the crank-shaft 19 with the crank axle 15 is made by means of a journal bearing casting 29 formed on the lower end of the crank axle 15. The inner end of the crank-shaft 19 has the crank arm 20 which is connected by a lifting link 21 with the manually adjustable mechanism 22.

Rigidly connected to the crank-shaft 19 by means of a key 30 is a circular cam plate 31 having diametrically opposed slots 32 and 33 in its periphery. Adapted to operate over this circular cam plate is an engaging roller 34 retained on an operating crank arm 35 by a cotter pin 36. This crank arm 35 is journaled on the crank axle 15 as indicated at 37 and is adapted to be operated by a lever arm 38 having on its upper end a rope 39 extending forwardly to be accessible to an operator located on the operator's station of a tractor.

Journaled on the crank-shaft 19 is a wheel sleeve or hub 40 on which is connected the ground drive wheel 17. This ground drive wheel 17 is connected to drive the sleeve 40 on the crank-shaft 19. The wheel 17 also taken with the wheel sleeve 40 forms a ground drive means for the clutch device. On the inner end of the sleeve 40 is a cylindrical face portion 41 about which is wrapped a coil spring 42. This coil spring 42 is anchored to the circular cam plate 31 by slot means indicated at 43. When the coil spring is released so that it is frictionally engaged or wrapped about the cylindrical face portion 41, the wheel will drive through this frictional engagement the circular cam plate 31 and the cam shaft 19 which is in turn keyed to the cam plate thereby causing the crank arm 20 to be rotated through a half revolution from a downwardly extended position to a vertically extended position. When this takes place, the plow frame 11 will be adjusted about the crank axle 15 and lifted to its transport position on the supporting wheels 16 and 17. The rear portion of the plow may have a pivotable rear furrow wheel 44 adapted to be operated by means 45 connecting the rear furrow wheel 44 with the crank axle 15 so that lifting may be effected about the rear furrow wheel 14 as well as about the forward supporting wheels 16 and 17.

Surrounding the coil spring 42 and the cylindrical sleeve portion 41 is an enclosing or control sleeve 46 formed at its outer end with a bearing portion 47 for journaled connection with the cylindrical face portion 41. Within this bearing portion 47 is a sealing ring 48 serving to prevent, as much as possible, the inflow of dirt into the closure formed by the hollow sleeve 46. In the inner end of the sleeve is provided a second sealing means 49 for the same purpose. It should thus be apparent that the frictionally engaged surfaces of the various parts and devices are fully enclosed and that the device is thereby substantially dirt proof.

On the sleeve 46 are radially extending arms 50 and 51 located diametrically opposite from one another. These arms extend sufficiently radially to be located in the path of the engaging cylinder 34 when the same is located in one of the slots 32 and 33. A spring device 52 serves to normally retain the cylinder 34 within the slots 32 and 33 under a spring bias. A description of the operation of the device will now be made.

When the roller 34 is retained within the slot 33 of the cam plate 31, the coil spring 42 is retained in an unwrapped condition about the cylinder face portion 41 of the wheel sleeve 40. The radially extended arms 50 and 51 are deflected to the position as shown in Figure 5. The ground drive wheel means is thus free of the crank-shaft 19 and is rotated freely thereon. When the operator desires to have lifting movement imparted to the plow frame, the operating arm 38 is pulled forwardly by means of the rope 39 and is pivoted about the pivot point 37 to cause the roller 34 to be lifted out of the slot 33 and out of engagement with the radial arm 51 of the enclosing sleeve 46. As this is done, the coil spring 42 will be released and will wrap itself about the cylindrical face portion 41 to make frictional engagement with the wheel sleeve 40 to thereby cause turning movement of the cam plate 31 and of the crank-shaft 19 to take place. All of the locked parts will rotate through 180°, and the roller 34 will roll over the outer periphery of the cam plate 31 at the end of which time it will seat itself in the opposite slot 32. As it seats itself in the slot 32, the coil spring will be automatically unwound by virtue of the fact that the radially extending arm 51 has been rotated through a small angular movement to cause unwrapping of the coil spring 42.

The cam plate and the control sleeve 46 will have rotated in the direction of the arrows 53 taking with them the crank arm 20 to thereby effect lifting through the lifting link 21 of the plow frame 11. As the roller 34 is removed from the slot 33 to assume the position of the same shown in Figure 6, the radial arms 50 and 51 are rotated in the direction of the arrows 54 until they engage a pin 55 on the plate 31. In this position the arms 50 and 51 will have moved angularly sufficiently to register respectively with the slots 32 and 33.

After the crank-shaft 19 has been rotated through a half revolution, the roller 34 slides down into the slot 32, whereupon the radial arms 50 and 51 will have been positively brought out of registry with the slots. As this takes place, an adjustable stop means 56 carried on the control sleeve 46 will have engaged the free end 57 of the coil spring 42. Movement will then have been imparted to the coil spring to cause its unwrapping about the cylindrical face portion 41. Simultaneously, the crank-shaft 19 will have been released from the ground drive wheel 17 and will have been located in its forwardly extended position by means of the roller 34 in the slot 32. The result is that the cam plate and the crankshaft will have been rotated in the anti-clockwise direction as indicated by the arrows 53.

When the roller 34 is out of engagement and the radial arms 50 and 51 have been moved into registry with the slots, the adjustable stop means 56 will have left its engagement with the end 57 of the coil spring 42 to allow the coil spring to freely wrap itself about the cylindrical face portion 41.

This adjustable stop means 56 is retained by a clamping nut 58 in its adjusted position. It serves to compensate for any wear that may have taken place on the frictional surfaces of the various parts of the device. Also, this adjustable stop means is convenient for making the proper original adjustment of the device as when there are certain manufacturing irregularities of the parts which must be compensated for.

It should now be apparent that the power lift device of this invention is simple in construction, cheap to manufacture, and substantially dirt proof whereby the same will have a long length of service.

While various changes may be made in the detail construction of this device, it shall be understood that such changes shall be within the spirit and scope of the present invention as defined by the appended claims.

What is claimed is:

1. In a power lift device for agricultural implements and the like having a ground wheel drive, a shaft having a crank arm for supplying lifting force to effect the operation of the agricultural implement, a wheel sleeve journaled on said shaft, expansible coil spring means for at times frictionally locking the wheel sleeve with the shaft, and means accessible to the operator of the implement for controlling the operation of the coil spring.

2. In a power lift device for agricultural implements and the like having a ground wheel drive, a crank-shaft for supplying lifting force to effect the operation of the agricultural implement, a wheel sleeve journaled on the crank-shaft having a cylindrical face portion thereon, expansible coil spring means adapted to wrap itself about the cylindrical face portion of the wheel sleeve for frictional locking engagement therewith, means for anchoring the coil spring to the crank-shaft, and means for controlling the expansion and contraction of the coil spring means.

3. In a power device for agricultural implements and the like, a crank-shaft for supplying operating force to effect the operation of the agricultural implement, a ground drive wheel means journaled on the crank-shaft and having a face portion thereon, a clutch spring anchored to the crank-shaft and adapted to frictionally engage the face portion of the ground drive wheel means, and means for controlling the operation of the clutch spring.

4. In a power lift device for agricultural implements and the like, a crank-shaft for supplying lifting force to effect the operation of the agricultural implement, a ground drive wheel means journaled on the crank-shaft and having a cylindrical face portion thereon, a circular plate secured to the crank-shaft and having diametrically opposed slots in its periphery, a coil spring wrapped about the cylindrical face portion of the drive wheel means and adapted for frictional engagement therewith, means for anchoring one end of the coil spring to the circular plate, a control sleeve surrounding the coil spring and adapted to be rotated into abutment with the other end of the coil spring to unwrap the same, said control sleeve having opposing radially extending arms adapted to be respectively alined with the diametrically opposed slots, means adapted to fit within the slots when they are respectively registered therewith and to engage one of the arms of the sleeve to thereby retain the coil spring in its upwrapped condition and out of engagement with the cylindrical portion, and means for operating said latter means to effect half revolution of the crank-shaft.

5. In a power lift device for agricultural implements and the like, a crank-shaft for supplying lifting force to effect the operation of the agricultural implement, a ground drive wheel means journaled on the crank-shaft and having a cylindrical face portion thereon, a circular plate secured to the crank-shaft and having diametrically opposed slots in its periphery, a coil spring wrapped about the cylindrical face portion of the drive wheel means and adapted for frictional engagement therewith, means for anchoring one end of the coil spring to the circular plate, a control sleeve surrounding the coil spring and adapted to be rotated in abutment with the other end of the coil spring to unwrap the same, said control sleeve having opposing radially extending arms adapted to be respectively alined with the diametrically opposed slots, adjustable stop means on the control sleeve for adjusting the point of engagement of the sleeve with the active end of the coil spring as the sleeve is rotated to unwrap the coil spring whereby adjustment may be made for wear of the spring and of the face portion or for manufacturing irregularities, means adapted to fit within the slots when they are respectively registered therewith and to engage one of the arms of the sleeve to thereby retain the coil spring in its unwrapped condition and out of engagement with the cylindrical portion, and means for operating said latter means to effect half revolution of the crank-shaft.

6. In a power device for agricultural implements and the like, a crank-shaft for supplying the operating force to effect the operation of the agricultural implement, a ground drive wheel means journaled on the crank-shaft and having a cylindrical face portion thereon, a coil spring adapted to frictionally engage the cylindrical face portion of the drive wheel means, means for anchoring one end of the coil spring to the crank-shaft, means for controlling the engagement of the coil spring with the face portion of the drive wheel means, and adjustable stop means associated with said latter means for adjusting the point of engagement of the same with the other end of the coil spring whereby adjustment may be made for wear of the spring and of the face portion or for manufacturing irregularities.

7. In a power lift device for agricultural implements and the like having a crank axle for supporting the implement frame, a crank-shaft for supplying lifting force to effect the operation of the implement, ground drive wheel means journaled on the crank-shaft and having a cylindrical face portion thereon, a coil spring anchored to the crank-shaft and wrapped about the cylindrical face portion for frictional engagement therewith, and means for unwrapping the coil spring to free the wheel means after the crank-shaft has been rotated a predetermined amount.

8. In a power lift device for agricultural implements and the like having a crank axle for supporting the implement frame, a crank-shaft for supplying lifting force to effect the operation of the implement, ground drive wheel means journaled on the crank-shaft and having a cylindrical face portion thereon, a coil spring anchored to the crank-shaft and wrapped about the cylindrical face portion for friction engagement therewith, means for normally retaining the coil spring in an unwrapped condition about the cylindrical face portion, and means accessible to the operator of the agricultural implement for optionally releasing the retaining means whereby the coil spring will wrap itself about the cylindrical face portion to thereby effect rotation of the crank-shaft.

JAMES MORKOSKI.